(12) United States Patent
Betzler et al.

(10) Patent No.: US 7,788,639 B2
(45) Date of Patent: Aug. 31, 2010

(54) METHOD AND SYSTEM FOR AUTONOMIC SELF-LEARNING IN SELECTING RESOURCES FOR DYNAMIC PROVISIONING

(75) Inventors: Boas Betzler, Magstadt (DE); Mark Dettinger, Weil am Rhein (DE); Werner Ederer, Schoensich (DE)

(73) Assignee: International Business Machines Corporation, Armonk, NY (US)

( * ) Notice: Subject to any disclaimer, the term of this patent is extended or adjusted under 35 U.S.C. 154(b) by 953 days.

(21) Appl. No.: 10/951,460

(22) Filed: Sep. 28, 2004

(65) Prior Publication Data

US 2005/0071107 A1 Mar. 31, 2005

(30) Foreign Application Priority Data

Sep. 30, 2003 (EP) ................................. 03103625

(51) Int. Cl.
*G06F 9/44* (2006.01)
(52) U.S. Cl. ........................ 717/120; 717/121
(58) Field of Classification Search ................ None
See application file for complete search history.

(56) References Cited

U.S. PATENT DOCUMENTS

| | | | | |
|---|---|---|---|---|
| 5,307,354 | A | * | 4/1994 | Cramer et al. .................. 714/4 |
| 5,579,509 | A | * | 11/1996 | Furtney et al. ................ 703/27 |
| 5,581,788 | A | * | 12/1996 | Ballare ........................ 710/14 |
| 5,715,461 | A | * | 2/1998 | Yoshitomi ................... 717/177 |
| 6,088,732 | A | * | 7/2000 | Smith et al. ................. 709/229 |
| 6,543,047 | B1 | * | 4/2003 | Vrhel et al. ................. 717/121 |
| RE38,762 | E | * | 7/2005 | O'Connor ...................... 713/2 |
| 6,993,748 | B2 | * | 1/2006 | Schaefer ..................... 717/124 |
| 7,096,248 | B2 | * | 8/2006 | Masters et al. .............. 709/201 |
| 2001/0012986 | A1 | | 8/2001 | Conan et al. |
| 2001/0042123 | A1 | | 11/2001 | Moody et al. |
| 2003/0028578 | A1 | | 2/2003 | Jain et al. |
| 2004/0128651 | A1 | * | 7/2004 | Lau ............................ 717/124 |

FOREIGN PATENT DOCUMENTS

WO WO 02/102093 A1 12/2002

OTHER PUBLICATIONS

European Patent Office, European Search Report, Reference DE920030014, Application No./Patent No. 04103630.2-1243 / 1521177, Date Jun. 23, 2008, 3 pages.

* cited by examiner

*Primary Examiner*—Chuck O Kendall
(74) *Attorney, Agent, or Firm*—Jon A. Gibbons; Fleit Gibbons Gutman Bongini & Bianco P.L.

(57) ABSTRACT

The present invention relates to the field of provisioning of electronic computing resources via a network to a client, and in particular to a method for automatically selecting resources in for application environments consisting of a multitude of resources, wherein a resource managing component is provided for associating specific, selected resource combinations to the application environment, wherein a list of qualifying working combinations of the resource combinations is maintained. In order to improve provisioning, it is proposed to automatically generate combinations of resources, wherein respective search algorithms look for new resources within a pool of free resources, assemble a combination of resources which fulfil a set of predetermined rules, test such given new combination in multiple level preciseness, and define a fail over situation differently to prior art, namely by providing a new resource combination which was already tested for the exact business application and the exact business process for which it was designed.

20 Claims, 4 Drawing Sheets

METHOD AND SYSTEM FOR AUTONOMIC SELF-LEARNING IN SELECTING RESOURCES FOR DYNAMIC PROVISIONING

BACKGROUND OF THE INVENTION

1. Field of the Invention

The present invention relates to the field of provisioning of electronic computing resources via a network to a client, and in particular to a method and system for selecting resource combinations in an infrastructure comprising an application environment consisting of a given resource combination and a resource managing component having access to a list of successfully working combinations.

2. Description of the Related Art

A prior art software product which implements the above prior art method is commercially available and sold by IBM under the product name System Automation for OS/390, version 2.2, since the year 2002. The tool implemented therein is usable basically for application providers, who offer some business application which can be run by a client via a respective adapted network connection. In such use a pool of computing resources, further referred to as resources only, is configured in one or more distinct configurations, which are each able to build up a respective application environment at the server side for the client, in order to make the client run a business application via the network.

A second field of use is found in larger enterprise networks, in which one or more application environments are defined for a person or a group of persons, who also use the above-mentioned resources in order to do their job.

Generally, a resource is to be understood here as any computing entity that can be shared between some users. A resource can be a computing server, some storage unit, some quantity of business data, some quantity of software, a file system, etc., thus including physical entities and logical entities. In many cases a physical entity resource comprises some computing hardware, some operating system, possibly some middleware and some application software.

An application environment as referred to herein is to be understood as a logical collection of resources that are able to provide some specific service, for example to run some business application in the above sense.

A resource manager is understood thereby as a software component running on a respective server for managing one or more resources in the above sense and which is able to instantiate a combination of available resources for a given application environment, to reserve, free and configure resource combinations. A resource combination can, for example, be built up by the following components: (1) an IBM S/390 or zSeries server; (2) a Linux operating system (SLES 8); (3) a database (DB2); (4) a WebSphere Portal Server; and (5) a Cisco router.

Such prior art situation for the provisioning of business applications is sketched in FIG. 1. It will be described next including its disadvantages:

An application client 110, as mentioned above, comprises some hardware and software and some operatively working network connections in between in order to run a business application provisioned by an application provider 130, when a respective external request to provision, 120, is transferred via network to the application provider. At the application provider side a networked environment is present and maintained, which includes the following blocks of components:

First, an application environment is provided by the application provider side 130. It comprises networked resources as follows:

On some Intel PC hardware (HW) machine 144 a Windows operating system 142, for example Windows NT, is installed in order to operate a load balancer application 140. On a second hardware machine 154, for example an IBM PowerPC, the AIX operating system 152 is implemented to run some application server software 150. Then, on an IBM mainframe hardware machine 164 runs a Linux operating system 162 in order to run a database software application 166, which serves to perform the business process desired by the application client 110.

Second, a distributed resource manager 170 is a software component as mentioned above and implemented on some server hardware. It comprises a predefined list 172 of valid resource combinations, which can be interconnected and serve to run the business application for application client 110. In order to do so the application provider 130 may access and use a multitude 180 of resources 181, 183, 185, 186, which are interconnected into cooperating resource combinations in order to make the business application run in full functionality and with a minimum of hardware or software errors in order to guaranty the best possible quality of service to the client.

In the prior art software product mentioned above which is implemented in the component 170 in FIG. 1, the list of valid resource combinations 172 is created by manual work, done by staff members at the application provider side, for example in form of XML files, in which each entry of the list comprises a valid resource combination and the date of the last successful instantiation or invocation of the resource combination. Further, scripts are required for controlling the resources. Any interdependencies between resources must be programmed in those scripts. Due to the complexity of interdependencies between resources in prior art, it is very difficult to create combinations of resources across system borders. Each resource is monitored separately. If a resource fails and a restart is no more possible within the current system, the whole group of cooperating resources comprised of such combination is moved onto a standby system, which is maintained separately exactly for such so-called "fail over" situations. The disadvantage associated therewith is that redundant, mirrored fail over systems must be maintained in order to guarantee quality of service. In this context, a typical system would be an Intel PC with an adequate operating system and an Oracle database. Another system might be IBM server and a DB2 relational database. In the above-mentioned IBM software product Automation Manager, such above-mentioned interdependencies are defined by way of a set of abstract rules. The prior art resource manager guarantees that these interdependencies and other constraints, which may be added by staff, are satisfied.

In this prior art product the case is included in which resources of a defined combination are distributed over multiple systems. A further disadvantage of this prior art is, however, that those rules must be very detailed and precise, in particular the last mentioned cross-system-borders cases, as for example, untypical combinations like Intel PC and DB2 database, or an IBM Server plus Oracle database. If such detailed level is not present, the whole system must be replaced when only one component thereof fails.

Thus, the term "system" is to be understood herein with some degree of generality, and a system can be a single hardware server that is used to provide an application service. But for a more complex application, multiple servers in one location have to be considered as a single system that cooperates to accomplish the service for a specific application.

All resources are monitored separately and the working status of the combination yields directly as an AND connection of the respective resources. This concept relies on the assumption that, if all resources comprised of a given combination do work, the overall system required for some business process in a given business application will also work. This, however, is erroneous as daily experiences show.

The prior art fail over concept comprises some disadvantages, described as follows: due to complex configurations of resources including multiple patch levels, multiple user authorisations, modifications within a network, exchange of hardware components, possibly modifying a hardware license key and last but not least the progressive update in software versions, the fail over process provided by prior art does not work in a satisfying way, which is intolerable with the aim of high quality of service.

In view of the difficulties and disadvantages of prior art the present invention was built up.

It is thus an objective of the present invention to improve prior art method and system of resource selection.

SUMMARY OF THE INVENTION

This objective of the invention is achieved by the features stated in enclosed independent claims. Further advantageous arrangements and embodiments of the invention are set forth in the respective subclaims. Reference should now be made to the appended claims.

The basic principle of the present invention comprises automatically generating combinations of resources, wherein respective search algorithms repeatedly look for new resources within a pool of free resources, assembling a respective new combination of resources which fulfil a set of predetermined rules, automatically testing such given new combination in multiple level preciseness, automatically storing the test results in an "experience" list, and defining a fail over situation differently to prior art, namely by providing a new resource combination which was already tested for the exact business application and the exact business process for which it was designed.

The single optional step of preselecting an admissible subset of resources primarily means to exclude nonsense resource combinations, i.e. such combinations which make no sense for a person skilled in the art. As a simple example may serve a resource combination of an Apple computer combined with a DOS operating system. Of cause, many further "nonsense combinations" do exist which are not so simple as that one above as e.g.: (1) Printer+Database Software; or (2) IBM z990 server+Microsoft Windows 95; or (3) Dell PC+VSE Operating System.

Preferably, an entry of a successful combination comprises a time stamp giving evidence for the latest successful test of this particular combination. Experience shows that the more recent such successful test is, the higher is the chance that the combination still works.

When the experience list further comprises a list of failed resource combinations then a lookup into the failed entry section serves to avoid trying to test new combinations comprising any subset of failed resource subcombinations. When for example resource R1 does not work together with resource R2, then it makes no sense to initiate a self-learning algorithm according to the invention to initiate a combination of R1+R2+a third resource R3.

The method according to the present invention preferably involves that a combination specifies the particular hardware type like for example IBM PowerPC Processor type XXX and the software type, like for example Windows NT operating system, Version YY.Y, which are in use for a specific resource. It should further be added that under the term "software" any type of software is understood, including operating system software, middleware system software or application-oriented software.

The approach of the present invention is even more efficient when the version number of software components or of hardware components of a resource in use are considered because of the fact, that in many cases the step to a next higher version includes a considerable risk that at least one or more functional aspects of a given application does not work error-free.

The approach of the present invention comprises the generation and test of tuples (i.e., pairs or other subcombinations) of resources, in order to assemble a working resource combination. Given a case, in which a total number of 10 hardware resources and 20 software resources including driver software for input/output peripherals are used. Then, the test of the combination is progressed step by step, preferably, based on one resource or a pair of resources, the combination of which is already tested and thus known to be working. An individual score may assigned for each tuple of resources contained in a combination, and the individual scores combined to produce an overall result for the combination.

Then, predetermined scores are provided according to a preferred aspect of the present invention in order to tell the system that a given combination works or does not work. Further, such scores may additionally be created such that it further tells the system about the quality, in which a combination works or reflecting the preciseness of a test, like e.g. a successful ping yielding a score of 0.3 (1.0=optimum, 0=minimum) whereas a successful database update over a network yields a score of 0.5. Of cause, many further score qualities may be provided according to the invention. They are implemented accordingly either as a flag, or as an integer value, or differently. Further, when the experience list entry comprises either of time of day, day of week, month of year of the respective last successful test and/or of the last failed test and when it includes an expiration date, then the additional advantage results that undetected new facts or risks are maybe detectable either by a person studying the list or by processing by a respective data mining tool, when this list reveals a considerable time-dependent failure situation.

The approach of the present invention can further be extended advantageously, when idle resources are searched and tested automatically in the above sense for their ability to work, when this is done independently of an actual incoming request.

Further, an interface to human intervention may be advantageously provided on top of either of the features mentioned above, in order to provide for a possibility that an experienced person, skilled in the art can take influence on the scores generated by the program of the present invention. By that, one can be sure, not to exclude stuff experience from the progress as defined in the present invention.

BRIEF DESCRIPTION OF THE DRAWINGS

The present invention is illustrated by way of example and is not limited by the shape of the figures of the drawings in which.

DETAILED DESCRIPTION OF THE PREFERRED EMBODIMENT

Figure 1:
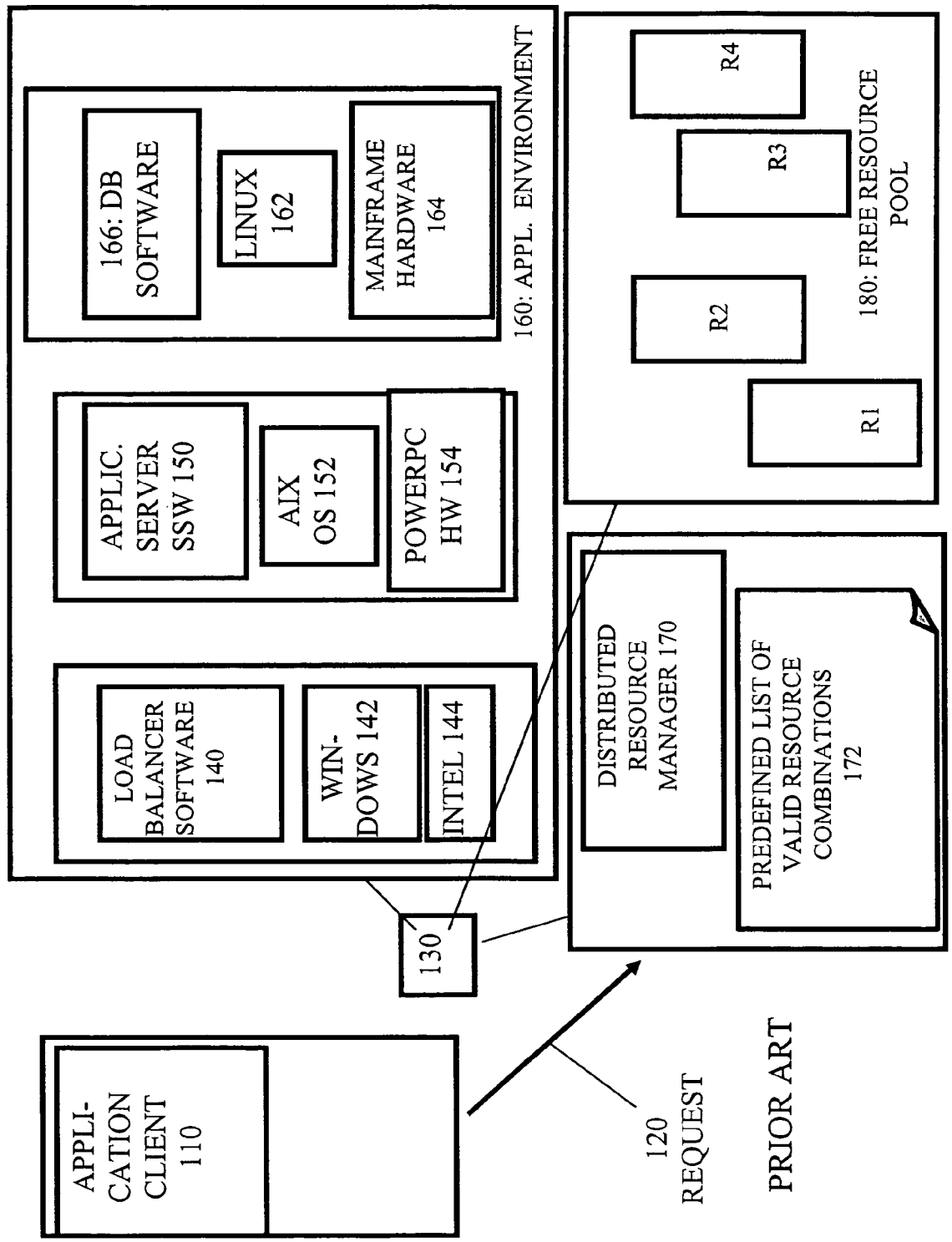
FIG. 1 is a schematic block diagram representation illustrating the most essential structural components of an IT environment, in which the present invention can be advantageously used (prior art)

With general reference to the figures and with special reference now to FIG. 2 an exemplary use of the method of the present invention is described next below illustrating the preferred features of the present invention.

The application client 110 further includes a software component 210 comprising an application test program forming part of the method of the present invention, which is bidirectionally coupled—see the network connection 220—with a self-learning resource selection component 276, which implements basically the main part of the method of the present invention according to the aspects as mentioned above, and which is also preferably located in the server system referred to as distributed resource manager 170. The component 276 of the present invention can write to and read from the above-mentioned experience list 278, which holds the resource combinations that were tested, either successfully or unsuccessfully.

A connection 280 is depicted representing the possibility of the self-learning resource selection component 276 to access the above mentioned free resource pool 180 and make new combinations 190, which is further described with reference to FIG. 3.

Figure 2:
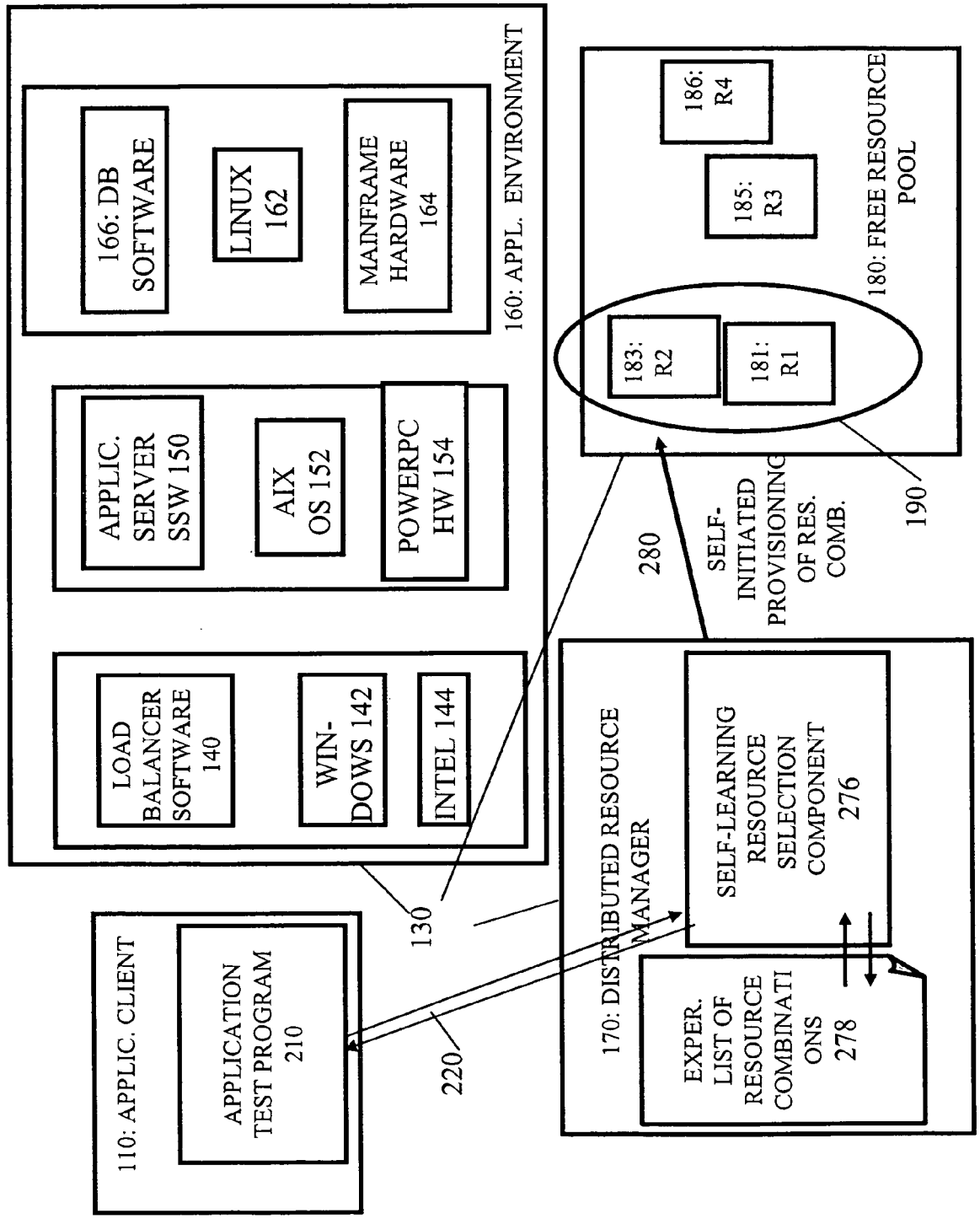
FIG. 2 is a representation according to FIG. 1 and illustrating the additional basic feature of the present invention in form of an experience list and a self-learning resource selection component.

As the rest of the components used in FIG. 2 are identical to prior art as described with reference to FIG. 1, the rest of the description of FIG. 2 can be obtained by reference back to the description of FIG. 1.

Figure 3:
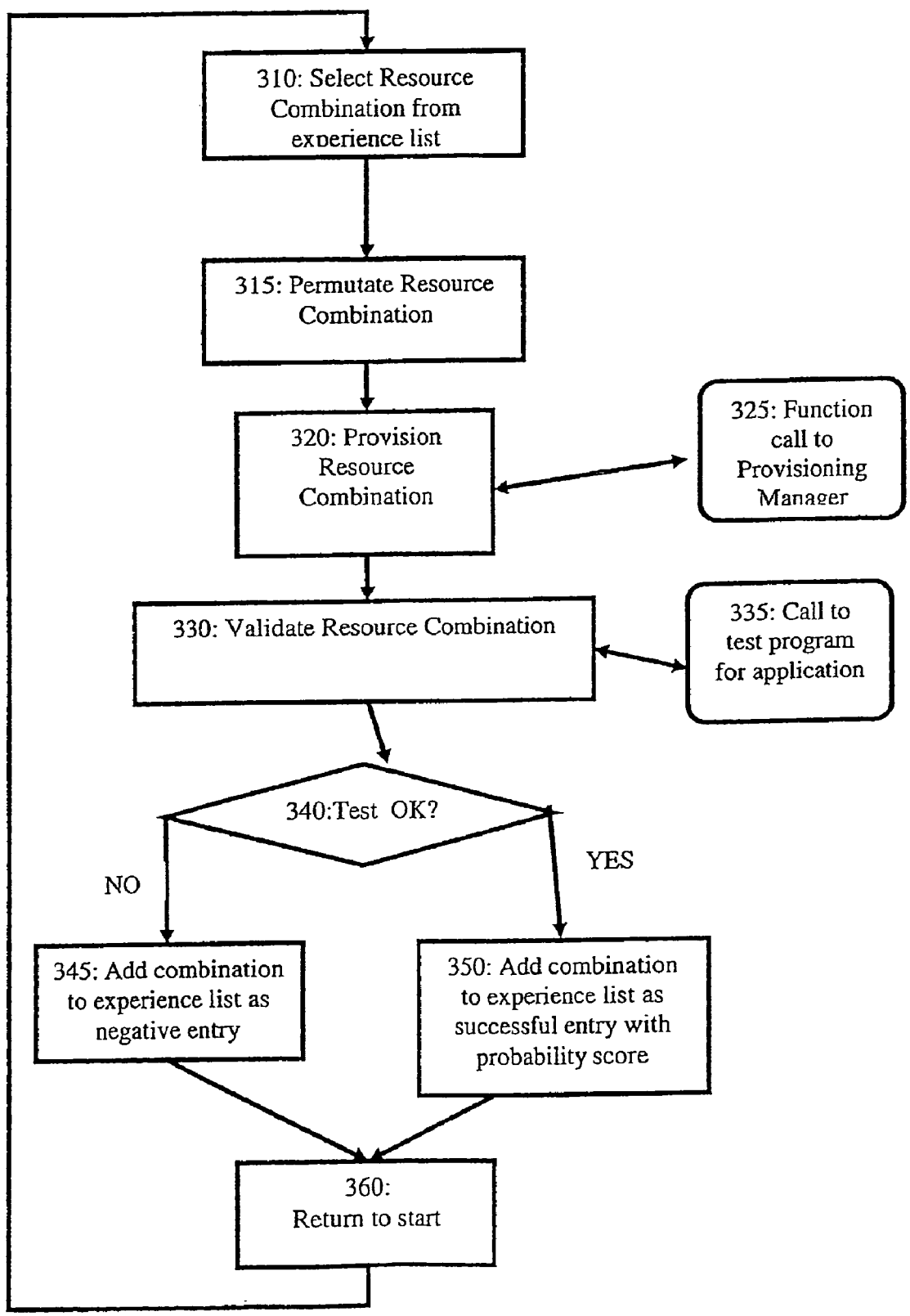
FIG. 3 is a block diagram representation illustrating the most important elements of the control flow in the method of the present invention of self-initiated learning when selecting resources.
Figure 4:
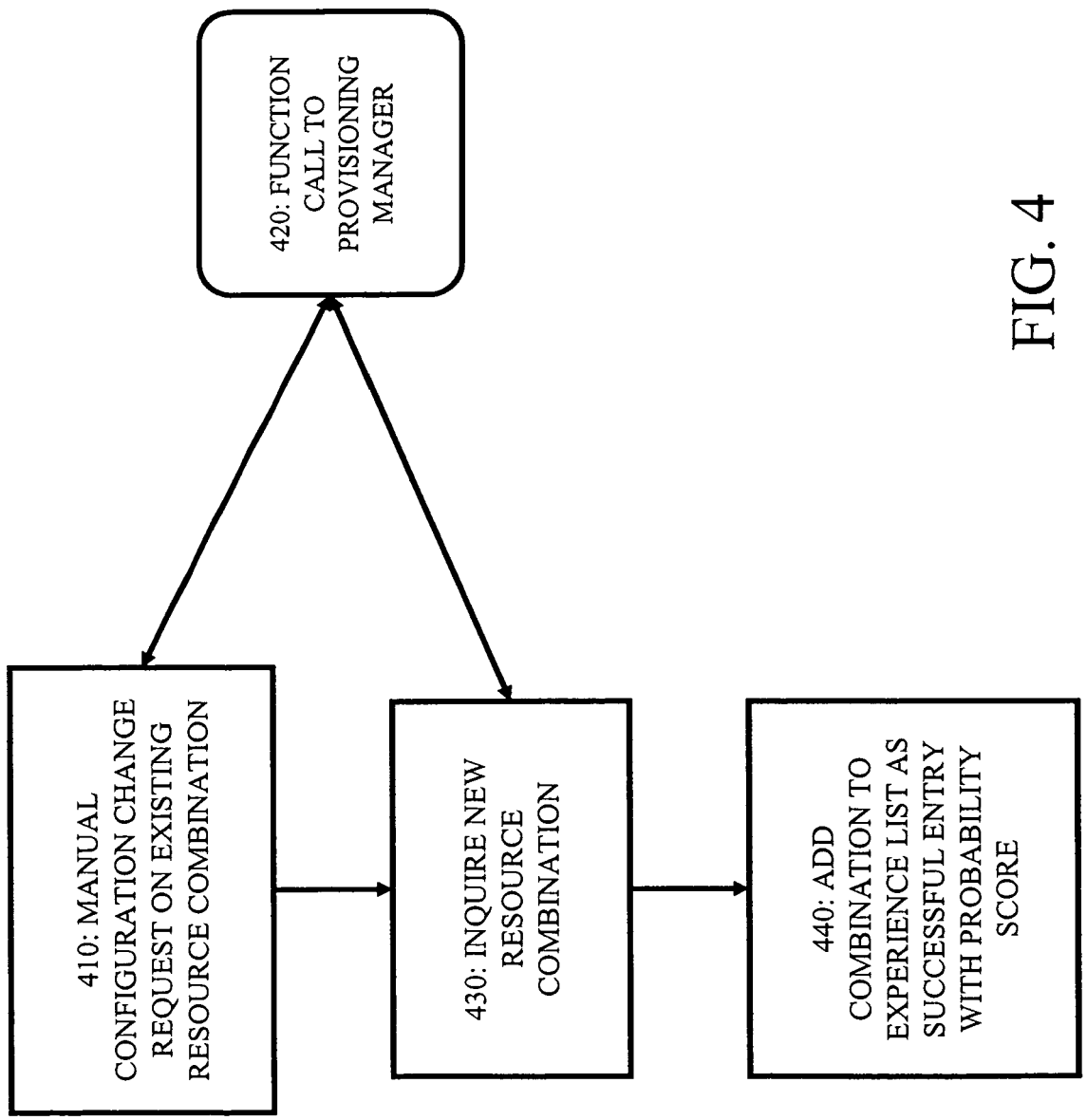
FIG. 4 is a representation according to FIG. 3 or FIG. 4 illustrating a manually initiated configuration change with update of the experience list of the present invention.

The activities of the self-learning resource selection component 276 provided by the present invention are next further described by aid of FIGS. 3 and 4, each illustrating the basic control flow in a method of the present invention according to respective embodiments thereof.

In a first step 310 a particular resource combination is selected from the experience list 278. Then, in a step 315, this resource combination is mutated in order to generate a new combination, see circle 190 in FIG. 2. By "mutated" here is meant that resources from the pool 180 are either substituted for resources in the combination or added to the combination; thus, mutation of the combination (a, b, c) may produce the combination (a, b, d) by substitution as well as the combination (a, b, c, d) by addition. Then a block 320 of provisioning this resource combination is entered, which begins with a call 325 to a software tool (not separately shown), called here provision manager.

In particular, the new resource combination is assembled by the provision manager. This tool performs the basic activities necessary in this context, such as reserve and interconnect hardware components, as far as this is possible by a pure program work, and prepares and performs the network installation of the required software components including operating system software and application software, and "middleware", if required.

Then the new resource combination should be able to be run and is forwarded—step 320—to the application test program depicted with reference sign 210 in FIG. 2.

This application test program 210 tries now to validate the new resource combination, step 330. This is preferably done by calling a test program for the application, step 335.

By virtue of this test, which is basically scalable according to the introduction given above, the new resource combination can be tested reflecting the business view of the application environment, which is more preferable than a more theoretical pure "IT view", as is done in the prior art.

Then, a decision 340 is made telling us if the test was successful or not. In the NO branch of decision 340 (left side) the current combination is added to the experience list in the form of a negative entry therein, step 345. Otherwise, see the YES branch of decision 340, the new combination is added as a "successful" entry into the experience list, together with a usefully defined probability score, as mentioned above, step 350. Then, in both branches, control is returned, step 360, to the start of the procedure in step 310.

As an alternative embodiment in form of a manually initiated learning component step 310 and step 315 can be performed manually. Thus, a manual request is issued to test a given resource combination. This resource combination is basically identically structured as the before-mentioned resource combination, which was selected by an algorithm of the present invention alone, without human intervention. The rest of the procedure is basically identical compared to the description of FIG. 3.

With reference to FIG. 4 a manually initiated configuration change of an existing resource combination is described, as follows:

In a step 410 a request comes in, which is manually initiated either by staff of the application provider, or by staff of the client side. The request inquires a new resource combination, step 430.

Again, the inventive part of this alternative embodiment of the present invention begins with a call 420 to the above introduced software tool, called provision manager.

Also here, the new resource combination is assembled by the provision manager as it is described above with reference to FIG. 3. Then the new resource combination should also be able to be run and is forwarded to the application test program depicted with reference sign 210 in FIG. 2.

If, in a test step 430, the new combination turns out to be running error-free, it is added as a positive, successful entry in the experience list, step 440.

Further, implementation details of the experience list 278, FIG. 2 are described next below:

An experience list 278 according to a preferred aspect of the invention maps resource combinations to scores. This can be implemented advantageously by a hash table as follows:

For a given list of resources rs, a predetermined hash function h computes a hash value h(rs) serving as an index into a hash table.

Then, the triple (rs, score, expiration date) is stored in the hash table at the position h(rs).

A preferred data structure for generating experience lists according to the present invention is as follows:

The individual elements that make up an experience list are triples of the form: (resource list, score, expiration date).

The first element of such a triple describes a list of individual resources; the second element assigns a score to this resource combination. It is preferred to include a field for an expiration date as well, for information stored in the experience list may not be valid forever. Further fields can be added as mentioned above.

The score can be a binary value (works or doesn't work), an integer (how well does it work?), a probability (how likely is it that it works?) or an even more complex value—depending on the desired amount of information that should be kept in the experience lists.

The lists of resources are preferably represented as lists of keys (Integers) that point to more detailed descriptions of the individual resources stored elsewhere.

The actual modification of the lists is done preferably as usual with hash tables. For a given resource combination, the corresponding hash element—a tuple, as described above—an be found quickly. Then, this element can be deleted or edited by assigning a new value to its score component.

At any point in time, a resource manager tool according to the present invention is dynamically provisioning one or more environments (i.e. resource combinations)—either for a customer who asked for one, or for itself for experimental purposes.

Whenever new insight is gained about one of the provisioned environments—because it just failed, or because it is now running without errors for a specified amount of time—the information about this environment is updated as explained above.

Environments for customers are provisioned that were actually asked for by such customer. New experience about these environments may be gained anytime and saved for future use, as mentioned above.

According to a preferred aspect of the present invention, whenever resources are idle, the resource manager of the present invention can use them to randomly test a new combination or retest a known combination, for example, because its expiration date is in the near future. Advantageously, the setting, which kind of experiment the resource manager prefers to do—if there is any choice to make is customisable.

Tests of new combinations can be further classified into tests of slightly modified known combinations and tests of entirely new combinations. Slightly modified, known combinations are probably more likely to be successful, so they should be chosen more often. On the other hand, too many experiments of this kind may lead to an accumulation of very similar known successful combinations, whereas the search for entirely different combinations is neglected.

In this scenario, similar resources would be chosen each time, while other resources are idle.

Preferably, a balance is found in this respect. Further, preferably, a customisable setting is provided, providing some liberty, which type of experiment, i.e. new combinations or modified known combination, the resource manager chooses, and how often such selection is done.

Finally, a human administrator can manually edit the experience lists 278, for example by specifying a resource combination and assigning a score to it.

The present invention can be realized in hardware, software, or a combination of hardware and software. A tool according to the present invention can be realized in a centralized fashion in one computer system or in a distributed fashion where different elements are spread across several interconnected computer systems. Any kind of computer system or other apparatus adapted for carrying out the methods described herein is suited. A typical combination of hardware and software could be a general purpose computer system with a computer program that, when being loaded and executed, controls the computer system such that it carries out the methods described herein.

The present invention can also be embedded in a computer program product, which comprises all the features enabling the implementation of the methods described herein, and which when loaded in a computer system is able to carry out these methods.

Computer program means or computer program in the present context mean any expression, in any language, code or notation, of a set of instructions intended to cause a system having an information processing capability to perform a particular function either directly or after either or both of the following: a) conversion to another language, code or notation; or b) reproduction in a different material form.

The invention claimed is:

1. A computer implemented method for automatically selecting resource combinations in an infrastructure comprising an application environment comprising a given resource combination and a resource managing component having access to a list of tested resource combinations, the method comprising:
   executing on at least one processor residing on at least one information system the following:
   automatically generating a set of new resource combinations independently of user input from a pool of available resources, wherein the set of new resource combinations is generated from at least one previously tested resource combination;
   automatically testing each of the new resource combinations independently of user input to determine an ability of resources in the set of new resource combinations to work together; and
   responsive to a determination that resources in the set of new resource combinations work together, automatically adding the new resource combinations to the list.

2. The method of claim 1, further comprising:
   automatically preselecting an admissible subset of resources adapted to build up a working application environment.

3. The method of claim 1, wherein an entry in the list comprises a time stamp for a last proven working run of a resource combination.

4. The method of claim 1, wherein the list of tested resource combinations comprises entries for both working resource combinations and failed resource combinations and wherein automatically adding the new resource combination to the list further comprises:
   adding a new resource combination to the list of tested resource combinations as a working resource combination if resources in the set of new resource combinations work together it works, otherwise, adding the new resource combinations to the list of tested resource combinations as a failed resource combination.

5. The method of claim 1, wherein a resource combination specifies a hardware type and a software type in use for a specific resource.

6. The method of claim 1, wherein different version numbers of a software or hardware component of a resource in use are maintained.

7. The method of claim 1, wherein a score is assigned to a given tested resource combination for each tuple of resources contained comprised in the combination.

8. The method of claim 7, wherein different scores are generated for differently complex tests for a given resource combination.

9. The method of claim 1, wherein an entry in the list comprises time or date information for a last test with a given result.

10. The method of claim 9, wherein an entry in the list comprises time or date information for a last successful test.

11. The method of claim 9, wherein an entry in the list comprises time or date information for a last failed test.

12. The method of claim 1, wherein an entry in the list comprises an expiration date.

13. The method of claim 1, further comprising:
searching idle resources for an ability to work independently of an incoming request for provisioning from the pool of available resources.

14. The method of claim 1, further comprising:
providing an interface to human intervention to edit the list.

15. The method of claim 1, wherein the new resource combinations are automatically generated independently of user input by mutating resource combinations from the list of tested combinations.

16. The method of claim 1, wherein the new resource combinations are automatically generated independently of user input by substituting resources from the pool of available resources for resources in tested combinations.

17. The method of claim 1, wherein the new resource combinations are automatically generated independently of user input by adding resources from the pool of available resources to tested combinations.

18. The method of claim 1, wherein testing each of the new resource combinations further comprises excluding from testing new resource combinations comprising failed resource combinations as subsets thereof.

19. A computer program product for automatically selecting resource combinations in an infrastructure comprising an application environment comprising a given resource combination and a resource managing component having access to a list of tested resource combinations, the computer program product comprising:
a storage medium readable by a processing circuit and storing instructions for execution by the processing circuit for performing a method comprising:
automatically generating a set of new resource combinations independently of user input from a pool of available resources, wherein the set of new resource combinations is generated from at least one previously tested resource combination;
automatically testing each of the new resource combinations independently of user input to determine an ability of resources in the set of new resource combinations to work together; and
responsive to a determination that resources making in the set of new resource combinations work together, automatically adding the new resource combinations to the list.

20. A system for automatically selecting resource combinations in an infrastructure comprising an application environment consisting of a given resource combination and a resource managing component having access to a list of tested resource combinations, comprising:
a memory;
a processor communicatively coupled to the memory;
a distributed resource manager for automatically generating a set of new resource combinations independently of user input from a pool of available resources, wherein the set of new resource combinations is generated from at least one previously tested resource combination; and
a testing program for automatically testing each of the new resource combinations independently of user input to determine an ability of resources in the set new resource combinations to work together and responsive to a determination that resources in the set of new resource combinations work together, automatically adding the new resource combinations to the list.

* * * * *